Dec. 2, 1958     B. F. CAMPBELL ET AL     2,862,386
COMPRESSION TESTER
Filed April 16, 1956     2 Sheets-Sheet 1

INVENTOR.
BYRON F. CAMPBELL
BY HENRY P. MARUSEK
ATTORNEYS

Dec. 2, 1958         B. F. CAMPBELL ET AL         2,862,386
                       COMPRESSION TESTER
Filed April 16, 1956                           2 Sheets-Sheet 2
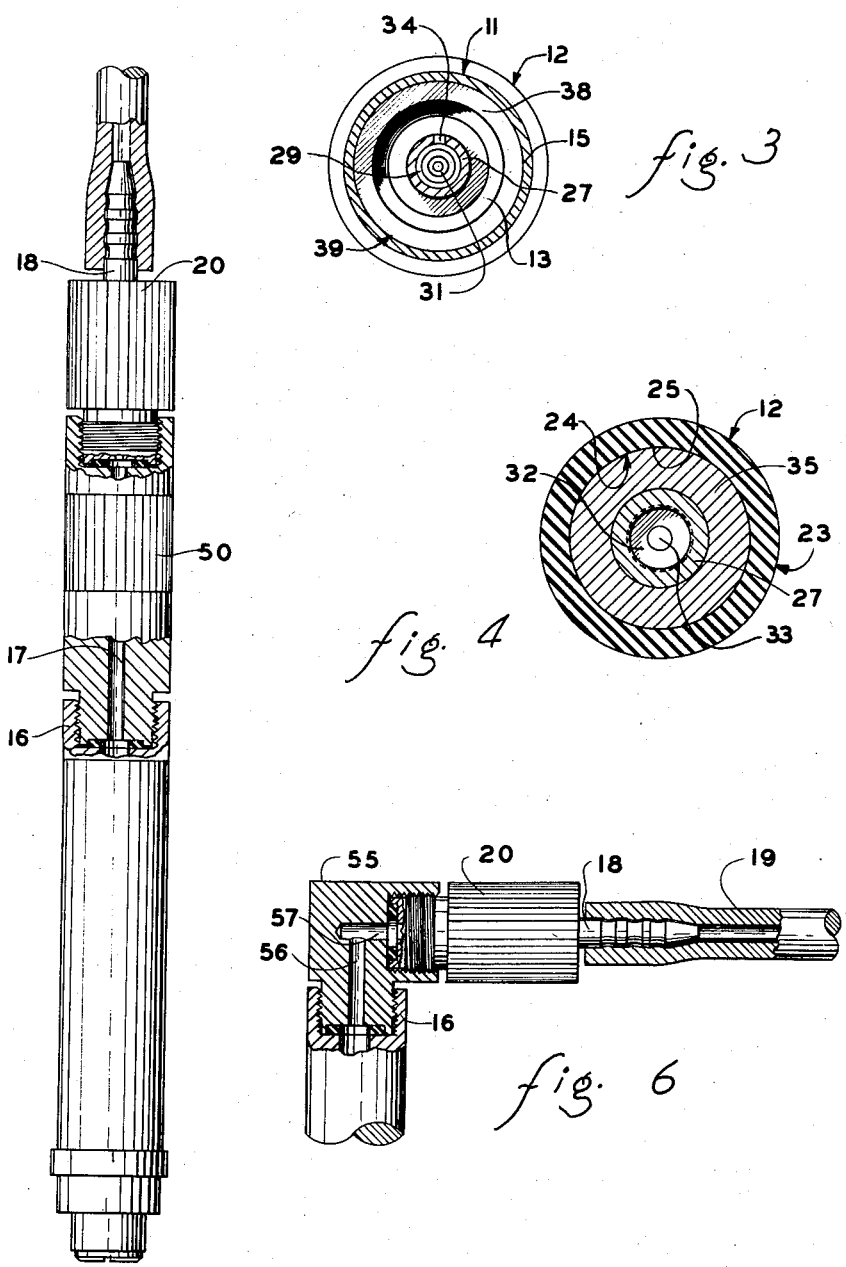
INVENTOR.
BYRON F. CAMPBELL
BY HENRY P. MARUSEK
ATTORNEYS

United States Patent Office 2,862,386
Patented Dec. 2, 1958

2,862,386
COMPRESSION TESTER

Byron F. Campbell, Kalamazoo, and Henry P. Marusek, Portage Township, Kalamazoo County, Mich., assignors to Allen Electric and Equipment Company, Kalamazoo, Mich., a corporation of Michigan Application April 16, 1956, Serial No. 578,318

3 Claims. (Cl. 73—116)

This invention relates in general to pressure testing apparatus, and relates particularly to a device for effecting a fluid tight communication between a pressure indicator and the interior of the chamber to be tested, such as a cylinder in an internal combustion engine.

In the checking and servicing of automobiles, or other equipment utilizing internal combustion engines, it is frequently necessary to determine the pressure developed within a cylinder in order, for example, to check the seal effected by the piston rings between the piston and the cylinder walls. Since this pressure is usually relatively high, it is correspondingly difficult for a mechanic to hold the pressure measuring apparatus in place solely by hand. Thus, it often happens that a pressure leak occurs between the measuring apparatus and the cylinder, which, unknown to the operator, results in producing a lower reading on the indicator than the actual pressure.

It is, therefore, desirable to provide a device which can be inserted into an opening, such as a spark plug opening or the nozzle opening in the case of diesel engines, communicating with the cylinder to be tested, which device will fit snugly within said opening, and which will utilize the pressure developed within the cylinder for holding said device tightly within said opening during the pressure reading operation.

It being desirable to minimize the number of pressure measuring devices required in a particular service station or garage, some adjustability and adaptability must be provided to compensate for the fact that the engine heads are made in a wide variety of shapes and sizes and that the spark plug openings thereof are located in different, and sometimes difficult to reach, positions on the various types of engines. Thus, the compression measuring device must be sufficiently versatile to be capable of use in openings of different sizes and depths, as well as in openings which are both recessed and not recessed. Likewise, the compression measuring device must be adaptable with few, if any, structural modifications for use on a variety of engines having spark plug openings in widely different locations.

Accordingly, a principal object of this invention is to provide a device for connecting a pressure indicator with the interior of a pressurizable chamber.

A further object of this invention is to provide a device, as aforesaid, for connecting a pressure indicator with the interior of an internal combustion engine cylinder, and which is particularly adapted to utilize, for such purpose, a spark plug opening or a nozzle opening.

A further object of this invention is to provide a device, as aforesaid, which will utilize the pressure from within said cylinder to cause the device to engage the walls of the opening sufficiently tightly that the pressure within the cylinder will not force the device out of place, and sufficiently closely that pressure within the cylinder cannot leak out around the engaging means.

A further object of this invention is to provide a device, as aforesaid, which will be ready for operation immediately upon being inserted into operating position, and will begin to operate automatically upon the occurrence of a pressure increase within the cylinder.

A further object of this invention is to provide a device, as aforesaid, wherein the amount of gripping force applied to the walls of the entry opening will increase with an increase in the pressure, and the sealing action of the device will thereby be automatically responsive to the magnitude of the pressure within the cylinder.

A further object of this invention is to provide a device, as aforesaid, which will be relatively simple in its construction and, therefore, economical to manufacture and to maintain.

A further object of this invention is to provide a device, as aforesaid, which can be utilized with a variety of different types and sizes of pressure indicators, without material change, if any, from one use to another.

A further object of this invention is to provide a device, as aforesaid, wherein the element actually engaging the walls of the entry opening is not only adaptable to openings of different sizes, but can be readily changed by the user in order to enable the device to engage walls of an even wider variety of shapes, sizes and other physical characteristics, whereby to provide the device with a high degree of versatility.

Other objects and purposes of this invention will become apparent to persons familiar with this type of equipment, upon reading the following specification and examining the accompanying drawings, in which:

Figure 3 is a sectional view taken along the line III—III of Figure 2.

Figure 4 is a sectional view taken along the line IV—IV of Figure 2.

Figure 5 is a side elevation view of the invention having an elongated adapter thereon, with parts thereof broken away and shown in central cross-section.

Figure 6 is a partially broken away view of a fragment of the construction of the invention having a right angle adapter connected thereto.

General description

Figures 1, 2:
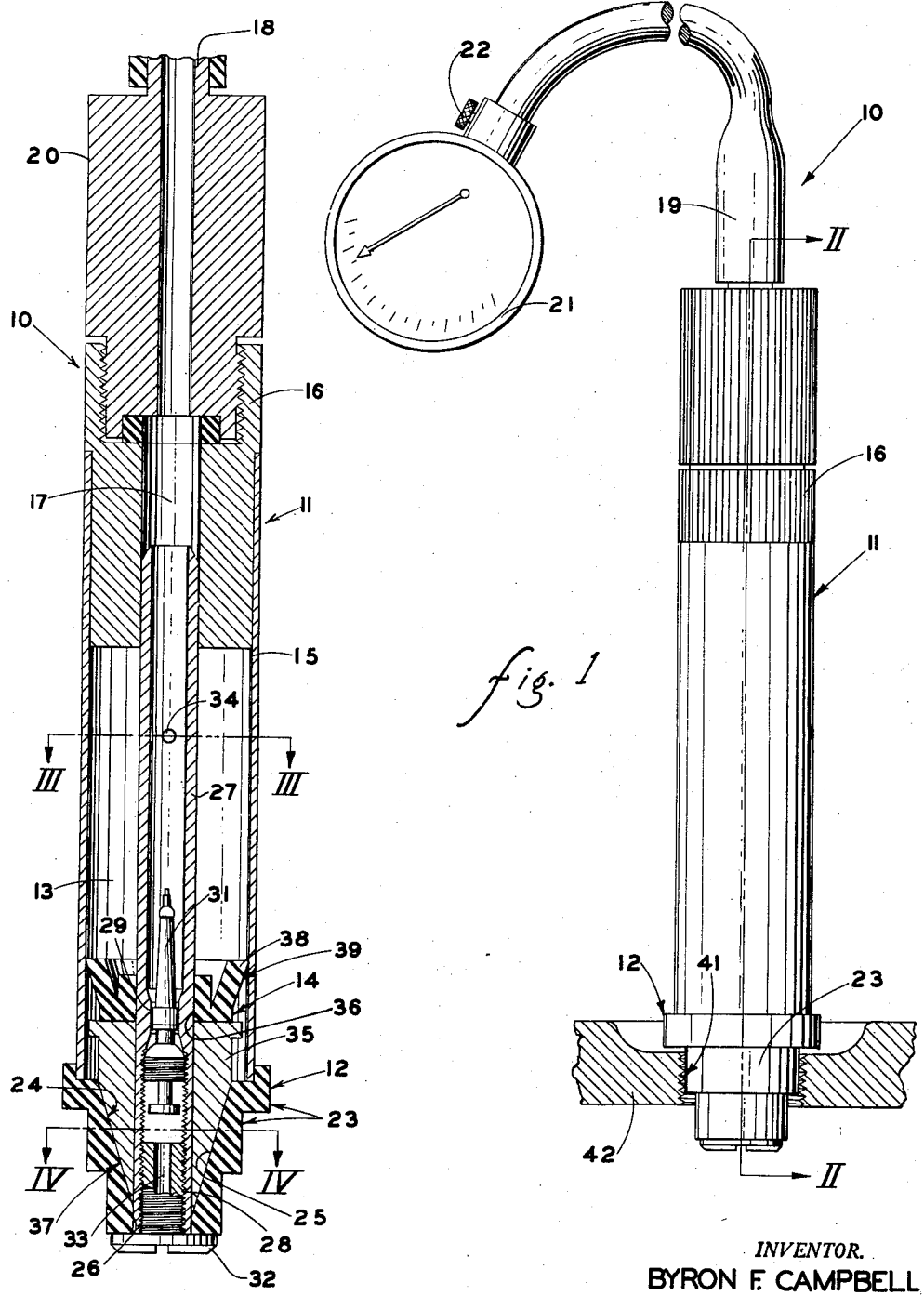
Figure 1 is a broken side elevation view of a compression tester embodying our invention and inserted into a spark plug opening in the wall of an internal combustion engine.
Figure 2 is a sectional view taken along the line II—II of Figure 1.

In order to meet the objects and purposes set forth above, as well as others related thereto, we have provided a compression tester 10 having a cylindrical body member 11 (Figures 1 and 2), said body member having an expansible end portion 12 and a cylindrical chamber 13 adjacent said expansible end portion 12. An expansion mechanism 14 is provided within the chamber 13 contiguous with, and partially within, the end portion 12 for effecting an enlargement of said end portion in response to an increase of pressure within the chamber 13.

For the purpose of convenience in description, the terms "upper," "lower," and derivatives thereof, will have reference to the compression tester 10 and parts thereof as appearing in Figures 1 and 2. The terms "inner," "outer," and derivatives thereof, will have reference to the geometric center of said tester and parts thereof.

Detailed description

As shown in Figures 1 and 2, the body member 11 of the compression tester 10 is comprised, in this particular embodiment, of a rigid, cylindrical casing 15 within which is located the chamber 13. The lower end of the casing 15 is engaged by an expansible end portion 12, and the upper end of said casing is closed by a cylindrical end plug 16 having a co-axial opening 17 therethrough. A connector 20 is detachably secured to the plug 16 and has a co-axial opening therethrough in alignment with said opening 17. A nipple 18 is integral with, and extends upwardly and co-axially from, the connector 20 for connecting the opening 17 with a flexible pipe 19 in a substantially conventional manner. Said pipe 19 is, in turn, connected to a pressure indicator 21 of any convenient, conventional type. The indicator 21 is provided with a manually operable relief valve 22, also in a conventional manner.

The expansible end portion 12 may be, and preferably is, provided externally with a plurality of co-axial and adjacent, cylindrical surfaces 23, which are of decreasing diameter away from the chamber 13, that is, downwardly. Said end portion 12 is also provided with a co-axial, internal opening 24, the lower or outer end 26 of which is cylindrical, and the upper or inner end 25 of which is conical and increases in diameter upwadly. The outer, cylindrical portion 26 is preferably of the same diameter as the cylindrical opening 17 through the upper end plug 16.

A tube 27, fabricated from a rigid and durable material, is snugly and non-movably disposed, as by a press fit, within the opening 17 of said end plug 16 and extends downwardly through the chamber 13 and the opening 24 to a point flush with the lower end of the end portion 12. The lower end of said tube 27 is internally threaded at 28 to threadedly receive a valve 31.

The valve 31 may be of any conventional type which permits the flow of gas upwardly through the tube 27 but prevents the flow of said gas downwardly.

An internal, annular ring 29 is provided integral with the tube 27 adjacent to the upper end of the thread 28. Said ring 29 provides a conventional valve seat for the valve 31 when said valve is threadedly received into the tube 27, as shown in Figure 2. A retaining screw 32, having a co-axial opening 33 extending completely therethrough, is threadedly received within the lower end of the tube 27 and provides means for preventing accidental disengagement of the expansible portion 12 from the tube 27. Said tube 27 is also provided with a port 34 through the side wall thereof, which port communicates between the chamber 13 and the interior of said tube 27 at a point between the valve 31 and the upper end of said tube.

The expansion mechanism 14 includes an expansion member 35 having a conical, external surface 37 and a co-axial bore 36, which bore snugly but slidably embraces the external surface of the tube 27. Said conical surface 37 snugly fits into the conical, inner portion 25 of the internal opening 24 in the expansible end portion 12. The expansion mechanism 14 also includes an annular piston 38, which encircles and snugly embraces the tube 27, lies against the upper surface of the expansion member 35, and has a periphery 39 which presses snugly against the wall of the cylindrical chamber 13. Thus, any gas or other fluid passing through the port 34 will tend to urge the piston 38 downwardly against the expansion member 35.

The body member of the tester 10 and the expansion member 35 are preferably fabricated from a relatively rigid material, such as a suitable metal. The expansible end portion 12 and the piston 38 are preferably fabricated from a resilient and flexible material, such as natural or synthetic rubber.

As shown in Figure 5, an elongated adapter 50 may be secured to the tester between the connector 20 and the end plug 16. The adapter 50 has fittings at either end for connection to said plug 16 and connector 20 and has a central opening co-axial with the opening 17.

In Figure 6, an adapter 55 is secured to the tester between the connector 20 and the end plug 16. Adapter 55 has a pair of bores 56 and 57, bore 57 communicating with, and lying at a right angle to, bore 56. Bore 56 is coaxial with opening 17. It is apparent that the length of the adapter and the orientation of the central opening therein will be chosen so that the tester will be capable of convenient use with an engine of a particular type or having spark plug or nozzle openings in a particular location. Thus, the length of the central opening and the angle which it makes with respect to the opening 17 may be varied as desired or required. Each service station will carry a supply of adapters of various types so that the tester may be readily converted for use on a variety of engine types by the interchange of adapters.

*Operation*

With the compression tester 10 assembled as shown in Figures 1 and 2, it is ready for immediate operation upon closing of the relief valve 22. In operation, the expansible end portion 12 is inserted into an entry opening, such as the spark plug opening 41, in the wall 42 of a conventional engine block and the proper step of the expansible end portion 12 fitted to the walls of said entry opening. Due to the plurality of differently sized, cylindrical surfaces on said expansible end portion 12, the tester 10 is readily adapted for entry into spark plug or other openings 41 having a variety of different sizes. As the pressure begins to build up within the cylinder (not shown) adjacent to said opening 41, gas from said cylinder will pass through the opening 33, will open the valve 31, and thence the greater part of the gas will pass on through the tube 27 and the pipe 19 into the indicator 21.

Meanwhile, a small part of the gas under pressure within the tube 27 will pass through the port 34 into the chamber 13 and build up a pressure therein proportional to the pressure in the cylinder being tested, thereby urging the piston 38 downwardly against the expansion member 35. In turn, the expansion member 35 will be urged downwardly within the internal opening 24 of the expansible end portion 12. Since the end portion 12 is made of resilient and flexible material, such downward movement of the expansion member 35 will effect an enlarging of the external diameter of the expansible end portion 12, thereby pressing it firmly and positively against the walls of the opening 41.

As the pressure is increased within the cylinder in the engine block 42, a corresponding increase in pressure will occur in the cylindrical chamber 13, thereby imposing a greater downward force on the expansion member 35 and resulting in increased sealing pressure between the walls of the opening 41 and the expansible end portion 12. Thus, it will be apparent that the sealing effect produced by the expansible end portion 12 is increased in response to, and correspondingly with, the increase in the pressure which the compression tester 10 is measuring.

The valve 31 retains the pressure within the tester 10 after the pressure is decreased in the engine block 42. In order to relieve such pressure, it is only necessary to open the manually operable relief valve 22. This permits the piston 38 and expansion member 35 to be urged upwardly by the resilience of the expansible end portion 12 as it tends to return to its original shape. Accordingly, the tester 10 can be easily removed from engagement with the walls of the opening 41 as soon as the pressure is released from within the tester 10.

The cycle of operation above described then can be repeated with respect to another cylinder, without further setting of the tester 10 and without the use of other adjustments.

To adapt the device for use with spark plug openings, or other access openings for the space being tested, of different sizes or shapes, it is necessary only to remove the screw 32, remove the member 12, replace it with one having the proper external shape and size, and then replace the screw 32. Likewise, to adapt the device for use with openings in different locations, it is necessary only to add or replace an adapter 50.

While the testing of internal combustion engines, either spark ignited or diesel, has been the major use for which the present invention was developed, and is herein employed to illustrate the invention, it will be apparent in view of the foregoing that this choice of field of use is merely illustrative and not limiting. Devices embodying the invention may be utilized through a very wide range of uses where a pressure is to be tested within a chamber to which access may be had through a hole in a wall of the chamber.

Although particular, preferred embodiments of our invention have been described in detail hereinabove for illustrative purposes, it will be understood that variations or modification thereof which lie within the scope of such invention are fully contemplated unless specifically stated to the contrary in the appended claims.

We claim:

1. A device for testing pressure within a walled space having an opening communicating therewith, comprising: means defining an air-tight chamber; an expansible end member secured in fluid-tight relationship to said means at one end of said chamber and receivable into said opening, said end member having a tapered, internal opening; a hollow open ended tube extending through said chamber, one end of said tube extending through said end member, and said tube having a port communicating between its interior and said chamber; a pressure indicator and means connecting same with the other end of said tube; a tapered expansion member encircling said tube adjacent said end member and snugly receivable into said internal opening; a piston encircling said tube between said port and said expansion member, said expansion member being urged by said piston to enlarge said expansible end member in response to the flow of said gas under pressure into said chamber; and means for releasing the pressure within said chamber.

2. The structure of claim 1 wherein the periphery of said piston is of resilient material and is pressed in sealing relationship against the walls of said chamber when said gas flows into said chamber, wherein said end member has a plurality of co-axial, cylindrical, external surfaces of decreasing diameter away from said chamber, and said internal opening and said expansion member have conical, mutually engaging surfaces converging away from said chamber.

3. In a compression tester insertable into an opening communicating with a source of pressure, said tester having an air-tight, cylindrical chamber and an open-ended tube passing co-axially therethrough, said tube having a port communicating between its interior and said chamber; mechanism for positively sealing said tester within said opening as said pressure is increased, comprising: a resilient end member on said tester, secured in fluid-tight relationship to one end of said chamber, said member having a plurality of co-axial, cylindrical, external surfaces arranged in decreasing diameters away from said chamber, said member having a conical, central opening converging away from said chamber, said tube extending through said opening and being in sealing contact therewith; an expansion member snugly, but slidably, encircling said tube and having a conical, external surface snugly contacting the walls of said central opening; and a piston snugly and slidably encircling said tube between said member and said port, the periphery of said tube being snugly and resiliently pressed against the walls of said chamber in sealing relationship, an increase in pressure within said tube causing said piston to urge said expansion member away from said chamber, thereby enlarging the diameter of said end member; and a valve within said tube and located between said port and outer end of said tube, said valve permitting flow of pressure from the outer end of said tube to said port but preventing flow of pressure in the reverse direction.

References Cited in the file of this patent

UNITED STATES PATENTS

| | | |
|---|---|---|
| 1,722,676 | Parker | July 30, 1929 |
| 2,352,350 | Smith | June 27, 1944 |
| 2,581,536 | Johns | Jan. 8, 1952 |
| 2,620,656 | Peterson | Dec. 9, 1952 |
| 2,731,827 | Loomis | Jan. 24, 1956 |